(12) United States Patent
Kawaura

(10) Patent No.: US 10,708,959 B2
(45) Date of Patent: Jul. 7, 2020

(54) APPARATUS AND METHOD FOR CONTROLLING THE USE OF AUTHENTICATION INFORMATION IN WIRELESS COMMUNICATION FOR ACCESS POINT

(71) Applicant: CANON KABUSHIKI KAISHA, Tokyo (JP)

(72) Inventor: Toshinori Kawaura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/971,764

(22) Filed: May 4, 2018

(65) Prior Publication Data
US 2018/0332634 A1 Nov. 15, 2018

(30) Foreign Application Priority Data
May 11, 2017 (JP) ................ 2017-094858

(51) Int. Cl.
| | |
|---|---|
| *H04W 48/00* | (2009.01) |
| *H04W 76/10* | (2018.01) |
| *H04W 48/08* | (2009.01) |
| *G06F 12/00* | (2006.01) |
| *G06F 3/12* | (2006.01) |
| *H04W 84/12* | (2009.01) |
| *H04W 8/00* | (2009.01) |
| *H04W 88/06* | (2009.01) |
| *H04W 4/80* | (2018.01) |

(Continued)

(52) U.S. Cl.
CPC ............ *H04W 76/10* (2018.02); *G06F 3/122* (2013.01); *G06F 3/1222* (2013.01); *G06F 3/1231* (2013.01); *G06F 3/1238* (2013.01); *H04W 48/08* (2013.01); *H04L 63/0428* (2013.01); *H04W 4/80* (2018.02); *H04W 8/005* (2013.01); *H04W 12/06* (2013.01); *H04W 84/12* (2013.01); *H04W 88/06* (2013.01)

(58) Field of Classification Search
CPC ..... H04W 76/10; H04W 12/06; H04W 84/12; H04W 4/80; G06F 3/1231; G06F 3/1238; G06F 3/1222; G06F 3/122; H04L 63/0428
See application file for complete search history.

(56) References Cited

U.S. PATENT DOCUMENTS

| | | | | |
|---|---|---|---|---|
| 7,290,067 B2* | 10/2007 | Fukunaga | ............ | G06F 9/4411 358/1.15 |
| 8,631,471 B2* | 1/2014 | Dattagupta | ........... | H04W 12/08 726/4 |
| 9,749,844 B1* | 8/2017 | Sovani | .................. | H04W 8/005 |

(Continued)

FOREIGN PATENT DOCUMENTS

| | | |
|---|---|---|
| EP | 3065428 A1 | 9/2016 |
| JP | 2008-182439 A | 8/2008 |

(Continued)

*Primary Examiner* — Juan M Guillermety
(74) *Attorney, Agent, or Firm* — Canon U.S.A., Inc. IP Division

(57) ABSTRACT

An information processing apparatus receives specifying information of an access point from a communication apparatus and performs connection processing to connect with the access point based on the specifying information. The communication apparatus is connected to the access point based on successful connection with the access point in the connection processing.

23 Claims, 10 Drawing Sheets

(51) Int. Cl.
  *H04L 29/06*     (2006.01)
  *H04W 12/06*     (2009.01)

(56) References Cited

U.S. PATENT DOCUMENTS

| | | | |
|---|---|---|---|
| 2009/0271709 A1* | 10/2009 | Jin | H04W 12/08 |
| | | | 715/739 |
| 2012/0250577 A1* | 10/2012 | Kimura | H04W 76/10 |
| | | | 370/254 |
| 2014/0362841 A1* | 12/2014 | Shibata | H04W 48/18 |
| | | | 370/338 |
| 2015/0038086 A1* | 2/2015 | Kim | H04W 12/06 |
| | | | 455/41.3 |
| 2015/0334581 A1 | 11/2015 | Minakawa | |
| 2016/0066326 A1* | 3/2016 | Choi | H04W 76/15 |
| | | | 370/329 |
| 2016/0232393 A1* | 8/2016 | Nakajima | H04W 12/04 |
| 2016/0261975 A1 | 9/2016 | Kurihara | |
| 2016/0269901 A1* | 9/2016 | Cao | H04W 12/06 |
| 2017/0006166 A1* | 1/2017 | Sumiuchi | H04W 12/06 |
| 2017/0041860 A1 | 2/2017 | Ogawa | |
| 2017/0041977 A1* | 2/2017 | Yokoyama | H04W 76/18 |
| 2017/0048705 A1* | 2/2017 | Fujita | H04W 12/06 |
| 2017/0102903 A1* | 4/2017 | Nagasawa | G06F 3/1222 |
| 2018/0324684 A1* | 11/2018 | Onohara | H04W 76/10 |

FOREIGN PATENT DOCUMENTS

| | | |
|---|---|---|
| JP | 4378323 B2 | 12/2009 |
| JP | 2014-241487 A | 12/2014 |
| JP | 2016-146608 A | 8/2016 |
| JP | 2017-034560 A | 2/2017 |

* cited by examiner

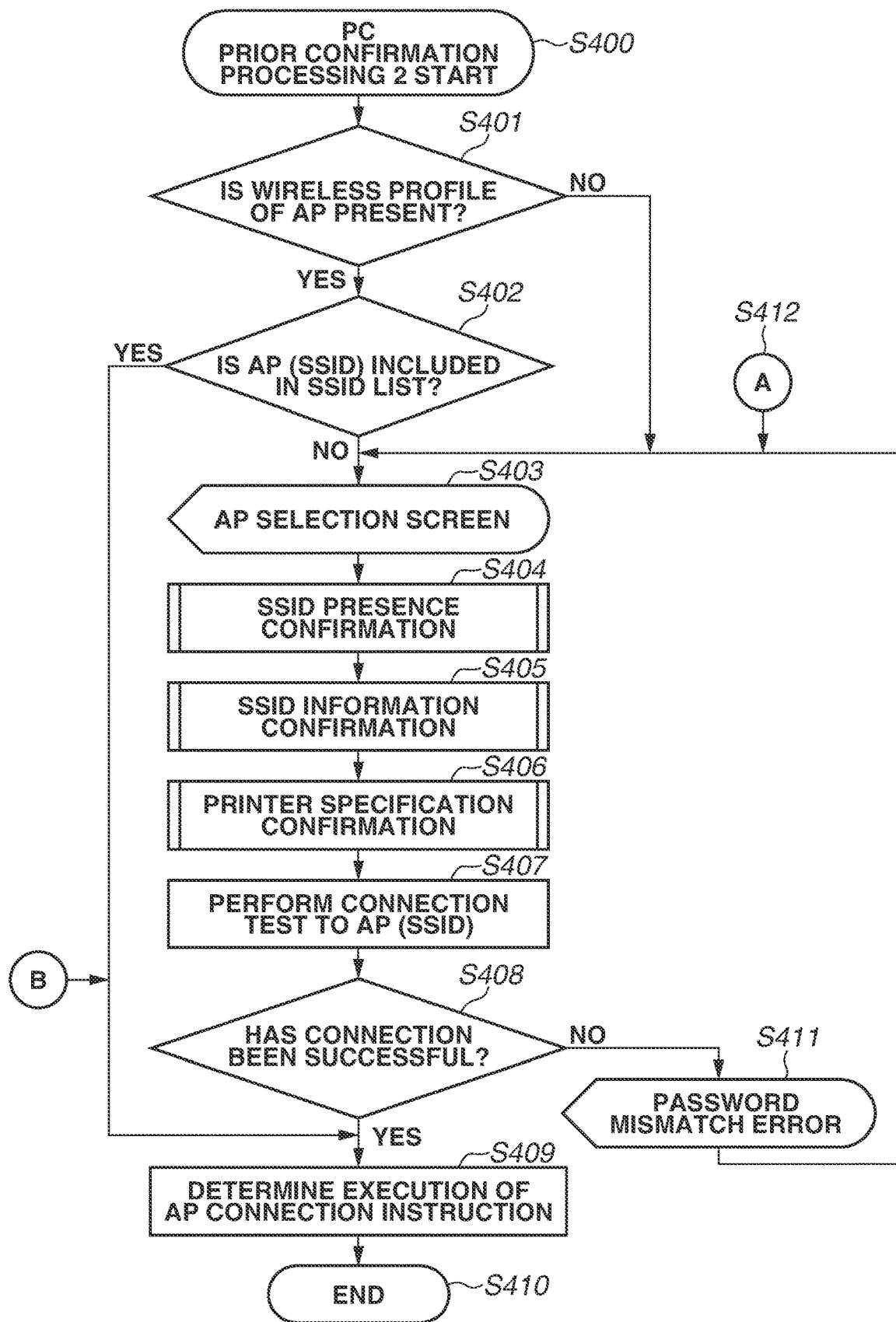

ACCESS POINT SELECTION
PLEASE SELECT ACCESS POINT TO BE CONNECTED TO PRINTER.

SSID LIST — *501*

- SSID-A
- SSID-A5
- SSID-B1      *502*
- SSID-B2
- SSID-C

PASSWORD — *503*
a b c d e 1 2 3 4

WEP KEY TO BE USED
1
*504*

[ MANUAL ADDITION ] — *505*

*506*
[ NEXT ]

ACCESS POINT MANUAL ADDITION

SSID                  [ SSID-D ] — *521*
ENCRYPTION SYSTEM     [ WEP ▼ ] — *522*

SETTING OF ENCRYPTION SYSTEM          *523*

| LENGTH OF WEP KEY | 13 LETTERS |
| FORMAT OF WEP KEY | STRING OF LETTERS ▼ |
| WEP KEY TO BE USED | 1 ▼ |

*524* — [ OK ]     [ CANCEL ] — *525*

APPARATUS AND METHOD FOR CONTROLLING THE USE OF AUTHENTICATION INFORMATION IN WIRELESS COMMUNICATION FOR ACCESS POINT

BACKGROUND

Field

The present disclosure relates to a recording medium storing a program executed by an information processing apparatus that performs wireless communication with a communication apparatus.

Description of the Related Art

There is a technology enabling a plurality of information processing apparatuses (hereinafter, referred to as PCs) to share an apparatus such as a printer serving as a communication apparatus through a local area network (LAN) connected to the internet. In some cases, the LAN is constructed by a wireless network, which provides convenience that an installation place of the apparatus is not limited as compared with a wired network. A user can experience difficulty in setting to enable the apparatus such as a printer to participate in the wireless network in some cases.

Japanese Patent No. 4378323 discusses the technology to cause the printer to easily participate in the LAN already constructed. The PC and the printer are connected in a peer-to-peer manner through universal serial bus (USB) cable connection. In addition, the PC transmits information to be used for connecting the printer to a specific access point to the printer through the USB cable.

In a case where an apparatus such as the printer tries to establish connection with the specific access point using the information for connection, the information can be invalid in some cases. In this case, as the above description in Japanese Patent No. 4378323, even when an information processing apparatus such as the PC transmits the information to an apparatus such as the printer and tries to connect the apparatus to the access point, the connection of the apparatus can fail in some cases. In this case, the processing for the connection with the specific access point performed by the apparatus such as the printer can become wasteful.

SUMMARY

The present disclosure is directed to addressing when a communication apparatus fails to establish connection with an access point in a case where an information processing apparatus connects the communication apparatus to the access point. According to an aspect of the present disclosure, a communication method executed by an information processing apparatus that performs wireless communication with a communication apparatus includes receiving specifying information of an access point from the communication apparatus, performing connection processing for connection with the access point based on the received specifying information, and controlling to connect the communication apparatus to the access point based on successful connection with the access point.

Further features of the present invention will become apparent from the following description of exemplary embodiments with reference to the attached drawings.

BRIEF DESCRIPTION OF THE DRAWINGS

FIG. 4 is a flowchart illustrating an example of processing of prior connection confirmation performed by the PC.

FIGS. 5A and 5B are diagrams each illustrating an example of a screen for selection of an access point.

DESCRIPTION OF THE EMBODIMENTS

Figure 1A:
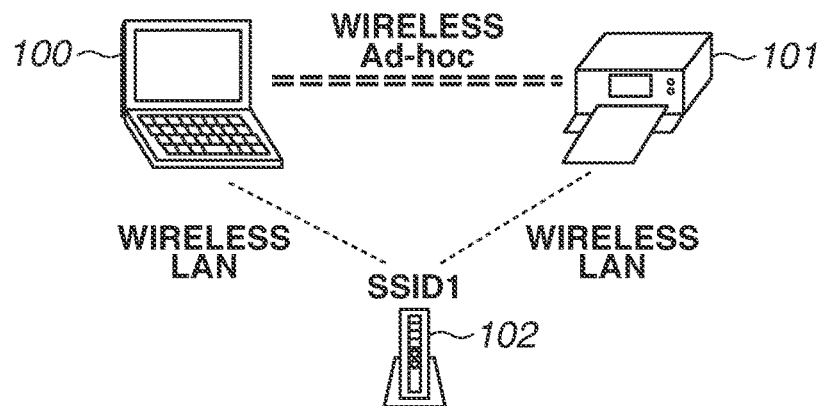
FIGS. 1A to 1D are diagrams to explain a system configuration according to an exemplary embodiment.

A first exemplary embodiment is described below with reference to accompanying drawings. The following exemplary embodiment does not intend to limit the present disclosure, and all of combinations of features described in the present exemplary embodiment are not necessarily essential for the solution of the present disclosure. Hereinafter, a printer that prints an image is described as an example of a communication apparatus according to the present exemplary embodiment. The communication apparatus, however, is not limited thereto, and processing in the present exemplary embodiment can be applied to various apparatuses such as a personal computer (PC), a smartphone, and a digital camera. In addition, a PC is described as an example of an information processing apparatus according to the present exemplary embodiment. The information processing apparatus, however, is not limited thereto, and processing in the present exemplary embodiment can be applied to various apparatuses such as a smartphone and a digital camera.

In the present exemplary embodiment, the PC transmits, to the printer, information relating to an access point to be connected to the printer, and connects the printer to the access point. For example, the PC automatically specifies the access point to which the PC has been connected from among access points to which the printer is connectable, and the PC transmits the information relating to the access point to the printer. The printer is then connected to the access point using the information. The information relating to the access point includes specifying information (e.g., service set identifier (SSID)) of the access point and authentication information (e.g., password) used in authentication processing of the access point.

For example, a case where the PC connects to the access point using a frequency band of 5 GHz, whereas the printer supports only wireless local area network (LAN) communication in a frequency band of 2.4 GHz, is assumed. At this time, a wireless profile of the access point to be connected to the printer is not saved in the PC. Therefore, in this case, a user needs to specify, on the PC, information of a desired access point, such as an SSID and a password.

In a case where the user inputs, for example, a wrong password, the printer receiving the password fails in connection with the access point, which results in connection error. The user typically recognizes the input mistake of the password after the connection error of the printer occurs. If the connection error of the printer occurs, it is necessary for the user to move to a place where the printer is installed, and to perform operation for releasing the error and preparation of the printer for reconnection. The password can be complicated for ensuring security, and such an input mistake by a user as described above can easily occur.

Accordingly, in the present exemplary embodiment, before the PC transmits, to the printer, the SSID and the password that have been input by the user, the PC uses the SSID and the password to try to establish connection with the access point. The PC notifies the printer of the SSID and the password if the connection is successfully established. In a case where the connection fails, the PC notifies the user of an error. This makes it possible to prevent the printer from failing in the connection with the access point due to the input mistake of the password in the PC, and to prevent the connection error. Accordingly, it is possible to reduce the user operation for releasing the error in the printer, and to promptly notify the user of the error, such as input mistake of the password.

FIGS. 1A to 1D are diagrams illustrating a system configuration according to the present exemplary embodiment. The system according to the present exemplary embodiment includes apparatuses such as a PC and a printer, and one or a plurality of access points.

In FIG. 1A, a PC 100 is connected to an SSID1 of an access point 102 through a wireless LAN. In addition, a printer 101 is also connected to the SSID1 of the access point 102. In other words, the PC 100 is communicable with the printer 101 through the access point 102. A connection method using an access point as described above is referred to as infrastructure connection (hereinafter, referred to as infra-connection). In the infra-connection, a network environment in which the PC is mutually communicable with two or more devices is constructed.

There is also a wireless Ad-hoc connection in which communication is performable only between two devices. The PC 100 and the printer 101 can establish Peer-to-Peer connection (hereinafter, referred to as P2P connection) through the wireless Ad-hoc connection. The PC 100 and the printer 101, however, cannot communicate with other devices during the wireless Ad-hoc connection because a wireless LAN dongle is used in the wireless Ad-hoc connection. Accordingly, the wireless Ad-hoc connection is often used as temporary connection.

The PC 100 performs processing to connect the printer 101 to the access point 102 through wireless LAN connection. Therefore, the PC 100 transmits network setting information to the printer 101 through the wireless Ad-hoc connection, thereby connecting the printer 101 to the access point 102.

Figure 2:
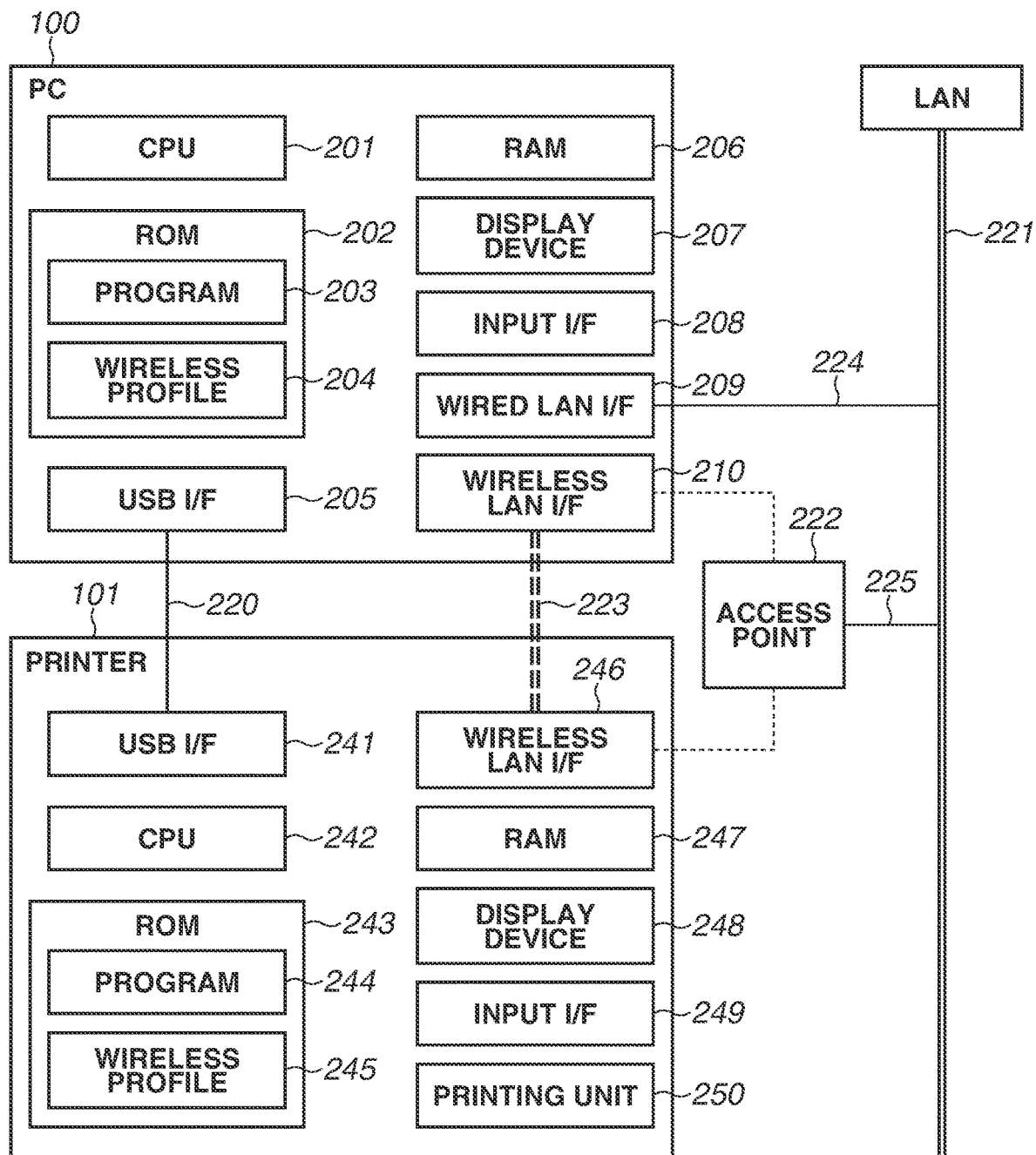
FIG. 2 is a configuration diagram of a personal computer (PC) and a printer according to an exemplary embodiment.

FIG. 2 is a configuration diagram of a communication system including the PC 100 and the printer 101. The PC 100 includes a central processing unit (CPU) 201, a read only memory (ROM) 202, a random access memory (RAM) 206, a display device 207, and an input interface (I/F) 208. The PC 100 also includes a universal serial bus (USB) I/F 205, a wired LAN I/F 209, and a wireless LAN I/F 210. It is sufficient for the PC 100 to include one or more of the USB I/F 205, the wired LAN I/F 209, and the wireless LAN I/F 210. The ROM 202 holds, for example, a program 203 for executing various kinds of processing, and a wireless profile 204 described below. The program 203 includes a program of wireless network setting processing to instruct setting of the wireless network to the printer. Details of the above-described wireless network setting processing is described below. The CPU 201 reads the program 203 from the ROM 202, loads the read program 203 into the RAM 206, and executes the program 203 to perform various kinds of processing including the above-described instruction processing. When a program (e.g., application) of the network setting processing is installed in the PC 100, a unique SSID is also stored in the ROM 202. The unique SSID is uniquely determined with respect to, for example, a manufacturer of the printer and a printer model.

The PC 100 can perform P2P communication with the printer 101 through a USB cable 220 or wireless Ad-hoc connection 223. The PC 100 is connectable to the LAN 221 through an Ethernet cable 224. If the printer 101 is also connectable to the LAN 221, the PC 100 and the printer 101 are communicable to each other in the same LAN 221 environment. The PC 100 is connected to the access point 222 through the wireless LAN (infra-connection), and the access point 222 is connected to the LAN 221 through an Ethernet cable 225. The PC 100 is connectable to the LAN 221 thereby.

The wireless profile 204 is information that includes, for example, specific information (e.g., SSID) of the access point 222 connected through the wireless LAN I/F 210 and authentication information (e.g., password) used in authentication processing. The wireless profile 204 is stored and managed when the CPU 201 executes an unillustrated operating system (OS) included in the ROM 202.

The printer 101 includes a CPU 242, a ROM 243, a RAM 247, a display device 248, an input I/F 249, a printing unit 250, a USB I/F 241, and a wireless LAN I/F 246. The ROM 243 stores, for example, a program 244 and a wireless profile 245. The CPU 242 reads the program 244 from the ROM 243, loads the read program 244 into the RAM 247, and executes the program 244 to perform various kinds of control in the printer 101. The printer 101 may not include the USB I/F 241.

The printer 101 can perform P2P communication with the PC 100 through the USB cable 220 or the wireless Ad-hoc connection 223. The printer 101 is connected to the access point 222 through the wireless LAN (infra-connection), and the access point 222 is connected to the LAN 221 through the Ethernet cable 225. As a result, the printer 101 is connectable to the LAN 221. The wireless profile 245 is information that includes setting of, for example, the SSID and the authentication information (e.g., password) of the access point 222 connected through the wireless LAN I/F 246. The wireless profile 245 is stored and managed when the CPU 242 executes the program 244 included in the ROM 243.

The ROM 243 stores the above-described unique SSID that is stored by the ROM 202 of the PC 100. The wireless LAN I/F 246 of the printer 101 can operate as an access point corresponding to the unique SSID.

The P2P communication by the wireless Ad-hoc connection 223 according to the present exemplary embodiment can be a communication method without using an access point, or a method in which the PC 100 or the printer 101 operates as an access point. For example, the wireless LAN I/F 246 operates as an access point corresponding to the above-described unique SSID. In this case, the wireless LAN I/F 210 is connected to the wireless LAN I/F 246 serving as the access point corresponding to the unique SSID. According to the method, the PC 100 is directly connectable to the printer 101 through connection processing similar to that of the external access point 222. Therefore, even in a case where the PC 100 cannot perform the processing for the Ad-hoc connection without the access point, the PC 100 can perform the P2P communication with the printer 101.

In FIG. 2, the processing of the PC 100 and the printer 101 are assigned as described above as an example; however, the assignment is not particularly limited thereto, and can be assigned in the other manner.

In the printer 101 according to the present exemplary embodiment, the user can perform an operation to connect the printer 101 to a desired access point based on display by the display device 248. For example, the user inputs the SSID and the password corresponding to the desired access point on the display device 248 of the printer 101, thereby connecting the printer 101 to the desired access point.

The display device 248 of the printer 101 can be configured in various forms, such as a small liquid crystal display (LCD), a segment display liquid crystal display, and blinking display using a light-emitting diode (LED), depending on a type of the printer 101. For example, in a case where the display device 248 of the printer 101 only performs blinking display using an LED, operation to connect the printer 101 to the desired access point may be difficult compared with a case of an LCD display that can perform sufficient representation.

Accordingly, in the present exemplary embodiment, the PC 100 performs wireless network setting processing on the printer 101 to connect the printer 101 to a predetermined access point. This enables, for example, a user unfamiliar with the operation on the printer 101 to easily connect the printer 101 to the desired access point. In particular, in a case where it is difficult to perform operation to connect the printer 101 to the desired access point on the display device 248 as described above, the user can easily perform operation according to the display on the display device 207 of the PC 100.

The printer 101, however, is not connectable to the access point in some cases even when the PC 100 performs the wireless network setting processing. For example, in a case where the SSID of the predetermined access point uses a frequency band of 5 GHz, but the printer 101 supports only a frequency band of 2.4 GHz, the printer 101 may not be connectable to the predetermined access point. In this case, the wireless network setting processing performed by the PC 100 with respect to the printer 101 and the processing performed by the printer 101 for connection with the access point become wasteful.

Accordingly, in the present exemplary embodiment, when the PC 100 connects the printer 101 to the predetermined access point, the PC determines whether the printer 101 is connectable to the predetermined access point in advance. The PC performs the wireless network setting processing to connect the printer 101 to the predetermined access point after the PC 100 determines that the printer 101 is connectable. The detail thereof is described below.

Figure 3:
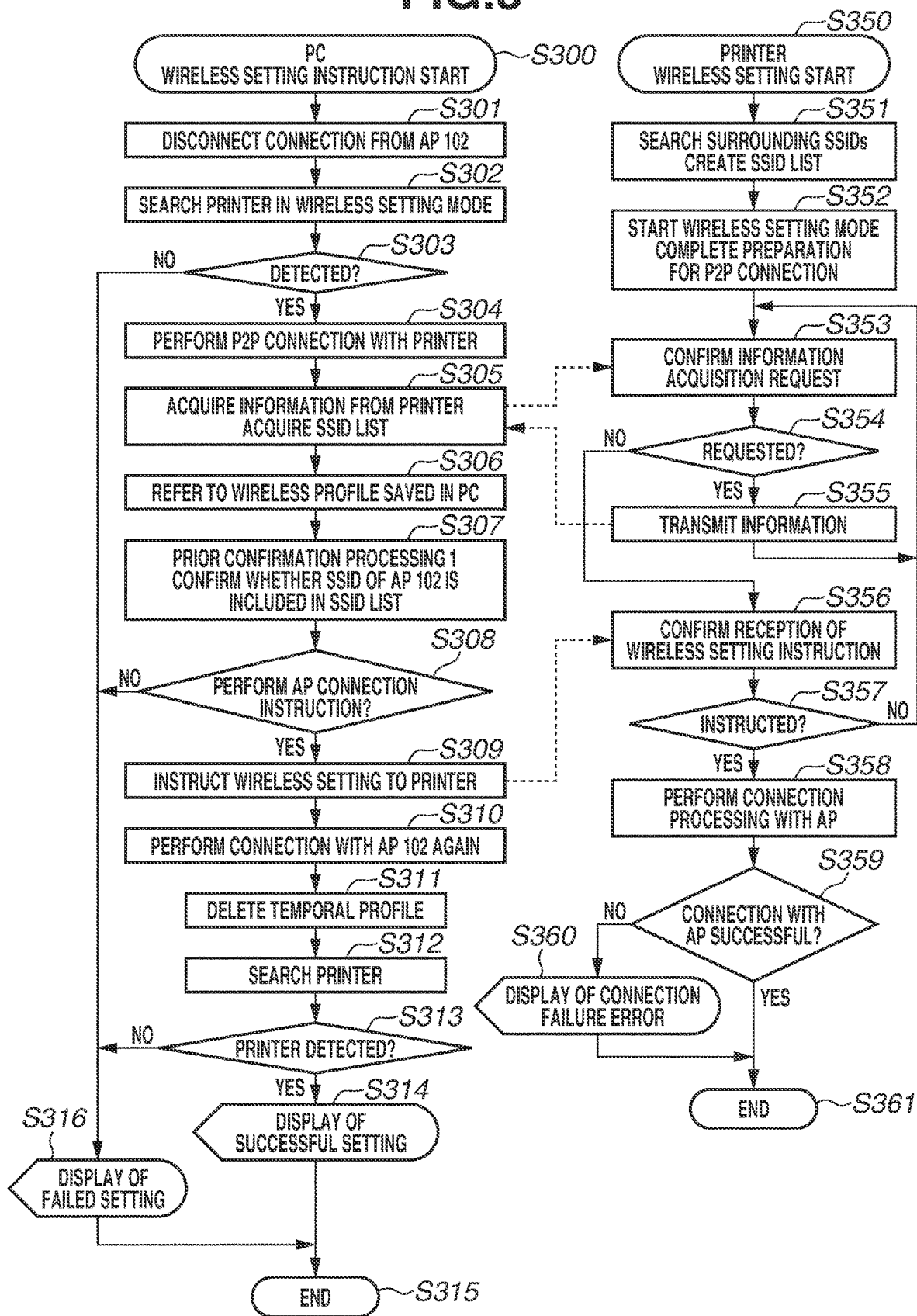
FIG. 3 is a flowchart illustrating an example of processing in which the printer performs wireless setting instructed by the PC.

FIG. 3 is a flowchart illustrating an example of processing in which the printer 101 performs wireless setting instructed by the PC 100. The processing by the PC 100 is realized when the CPU 201 executes the program 203. Likewise, the processing by the printer 101 is realized when the CPU 242 executes the program 244. There is a method to instruct the wireless setting of the printer 101 from the PC 100, and FIG. 3 is a diagram to explain a process flow of the method. In this example, it is assumed that the PC 100 previously connected to the external access point 102, and the SSID and the password of the access point 102 are included in the wireless profile 204.

A predetermined screen is displayed on the display device 207 by a program (e.g., application) of the network setting processing included in the program 203 in the PC 100. In step S300, when the user performs, on the screen, a predetermined instruction to connect the PC 100 to the printer, the PC 100 starts the processing for a wireless setting instruction. First, in step S301, the PC 100 disconnects the wireless connection with the access point 102. Next, the PC 100 searches the printer 101 in a wireless setting mode, described below, in step S302, and then determines a detection result in step S303. More specifically, the PC 100 searches an access point corresponding to the above-described unique SSID, and determines whether the searching is successful. In a case where it is determined in step S303 that the printer in the wireless setting mode has been detected (access point having unique SSID has been detected) (Yes in step S303), the processing proceeds to step S304. In step S304, the PC performs the wireless Ad-hoc connection with the printer 101. More specifically, the PC 100 connects the wireless LAN I/F 210 to the access point with the unique SSID.

Next, in step S305 the PC 100 performs information acquisition request to the printer 101, and receives a response from the printer 101 to receive an SSID list. The SSID list indicates access points searched by the printer 101. The detail thereof is described below. In addition, in step S305, the PC 100 receives identification information (e.g., media access control (MAC) address) of the printer 101 from the printer 101.

In step S306, the PC 100 refers to the wireless profile 204, and acquires a wireless profile including the SSID of the access point 102 connected at the start of the processing illustrated in FIG. 3 and disconnected in step S301. In step S307, the PC 100 confirms whether the SSID of the access point 102 acquired in step S306 is included in the SSID list acquired in step S305. In the present exemplary embodiment, the processing in step S307 is referred to as prior confirmation processing 1.

In step S308, the PC 100 determines whether to connect the printer 101 to the predetermined access point as a result of the prior confirmation processing 1 in step S307. In a case where it is determined in step S307 that the SSID of the access point 102 is included in the SSID list, it is determined in step S308 to connect the printer 101 to the predetermined access point. In a case where it is determined in step S308 to connect the printer 101 to the predetermined access point (Yes in step S308), then in step S309, the PC 100 transmits information instructing the wireless setting to the printer 101. More specifically, in step S309, the PC 100 transmits, to the printer 101, the wireless profile (including SSID and password) of the access point 102. Next, in step S310, the PC 100 disconnects the wireless Ad-hoc connection with the printer 101, and re-establishes connection with the access point 102. Since the wireless profile 204 of the access point 102 is saved in the ROM 202 in the PC 100, the PC 100 can re-establish connection with the access point 102 in step S310 without the user needing to re-input the password, etc.

Next, in step S311, if the wireless profile temporarily remains in the wireless Ad-hoc connection, the PC 100 deletes the remaining wireless profile. The processing in step S311 is performed to prevent the wireless profile of connection not intended by the user from remaining. Thereafter, the PC 100 searches the printer 101 using the infra-connection through the access point 102 in step S312, and determines whether the printer 101 has been detected in step S313. More specifically, in step S312, the PC 100 receives identification information (e.g., MAC address) from a device connected to the access point 102. It is also determined whether identification information that is coincident with the identification information acquired from the printer 101 in step S305 is included in the received identification information.

Figure 6A:
FIGS. 6A to 6H are diagrams illustrating various kinds of message screens displayed on the PC.

In a case where it is determined in step S313 that the printer 101 has been detected (Yes in step S313), then in step S314, the PC 100 displays, on the display device 207, a successful setting screen 600 as illustrated in FIG. 6A. When the user presses a "next" button 601 on the successful setting screen 600, then in step S315, the PC 100 terminates the wireless setting instruction processing. The PC 100 can establish the connection with the printer 101 at a timing when it is determined that the printer 101 has been detected in step S313, or at a timing when the "next" button 601 is pressed.

Figure 6B:

In a case where it is determined in the process in any of steps S303, S308, and S313 that the wireless setting in the printer 101 has failed (No in step S303, S308, or S313), the processing proceeds to step S316. In step S316, the PC 100 displays, as an error display, a failed setting screen 610 as illustrated in FIG. 6B. When the user presses a "next" button 611 in the failed setting screen 610, the PC 100 terminates the wireless setting instruction processing in step S315.

The wireless setting processing of the printer 101 is now described. In step S350, when the user performs a predetermined instruction on the display device 248 of the printer 101, the printer 101 starts the wireless setting processing. Upon start of the wireless setting processing, the printer 101 enters the wireless setting mode. In the wireless setting mode, the printer 101 causes the wireless LAN I/F 246 to operate as the access point of the above-described unique SSID. The wireless setting mode can be started based on the user performing an instruction for transition to the wireless setting mode as the above-described predetermined instruction, or on other conditions. For example, the printer 101 can temporarily transition to the wireless setting mode based on the printer 101 not connecting wirelessly when the printer 101 is turned on or the printer 101 is turned on for the first time after purchase.

In step S351, before transition to the wireless setting mode, the printer 101 first searches (passively scans) surrounding SSIDs, and creates the SSID list including the detected SSIDs. Then, in step S352, the printer 101 transitions to the wireless setting mode, and completes preparation for the wireless Ad-hoc connection. More specifically, the printer 101 causes the wireless LAN I/F 246 to operate as the access point of the above-described unique SSID. When the processes in steps S302 to S304 are performed by the PC 100 in this state, the printer 101 starts the P2P communication in response to connection request from the PC 100. The printer 101 confirms whether the information acquisition has been requested by the PC 100 in step S353. In a case where it is determined that the information acquisition has been requested (Yes in step S354), the processing proceeds to step S355. In step 355, the printer 101 performs information transmission processing. Then, the processing returns to step S353. Specifically, in step S355, the printer 101 transmits, to the PC 100, the SSID list and the identification information (e.g., MAC address) of the printer 101.

In a case where it is determined in step S354 that the information acquisition has not been requested (No in step S354), the processing proceeds to step S356. In step S356, the printer 101 confirms whether the wireless setting has been instructed by the PC 100. In a case where it is determined that the wireless setting has not been instructed (No in step S357), the processing returns to step S353. In a case where it is determined in step S357 that the wireless setting has been instructed (Yes in step S357), the processing proceeds to step S358. In step S358, the printer 101 performs connection processing with respect to the access point 102 specified by the PC 100. More specifically, in step S358, the printer 101 uses the SSID and the password included in the wireless profile received from the PC 100 to perform the connection processing with respect to the access point 102. Then in step S359, the printer 101 determines whether the connection processing is successful. In a case where it is determined that the connection processing failed (No in step S359), the processing proceeds to step S360. Then in step S360, a setting error (not illustrated) is displayed on the display device 248 of the printer 101. In step S361, when the user performs an operation to release the setting error (not illustrated) displayed on the display device 248 of the printer 101, the printer 101 terminates the wireless setting processing. In a case where it is determined in step S359 that the connection processing is successful (Yes in step S359), then in step S361, the printer 101 terminates the wireless setting processing.

As described above, the PC 100 transmits, to the printer 101, the wireless profile of the access point 102 previously connected, which makes it possible to connect the printer 101 and the access point 102 without requiring the input operation of the password, etc. on the printer 101.

Figure 1B:
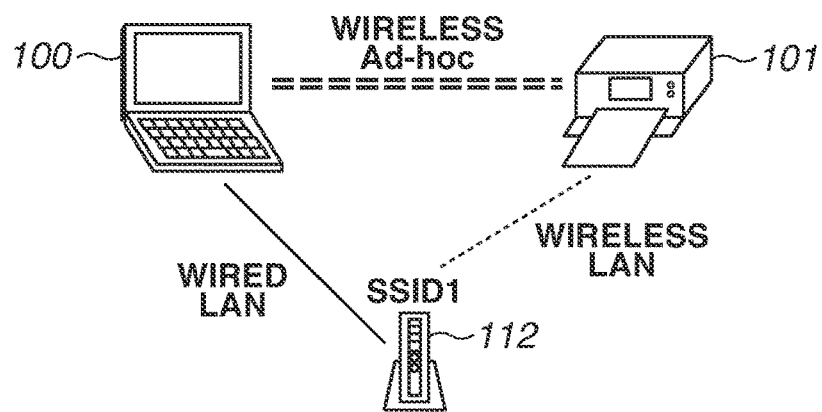
Figure 1C:
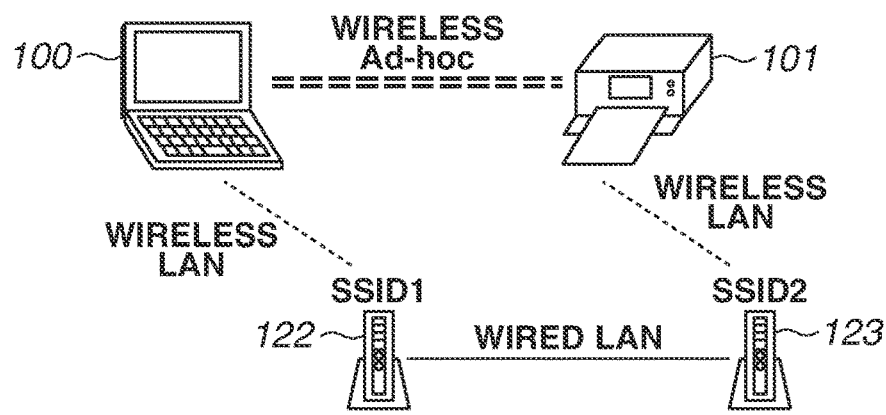
Figure 1D:
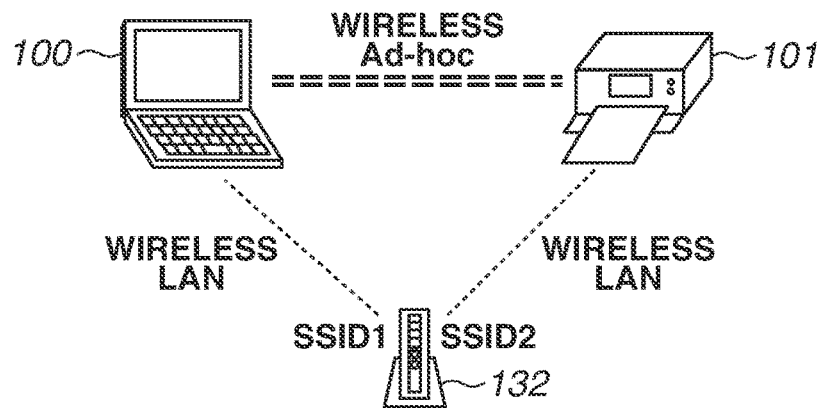

The wireless setting processing illustrated in FIG. 3, however, can fail (step S316) in some cases as a result of the determination (step S308) in the prior confirmation processing 1 (step S307). For example, the PC 100 may not hold the wireless profile of the access point to which the printer 101 is connected. In this case, in the prior confirmation processing 1, it is not determined that the SSID of the access point 112 is included in the SSID list (No in step S308). Accordingly, the setting processing illustrated in FIG. 3 fails. FIG. 1B to FIG. 1D each illustrate a case where the setting processing illustrated in FIG. 3 can fail.

The case of FIG. 1B illustrates an example in which the access point 112 and the printer 101 are connected through the wireless LAN in a case where the access point 112 and the PC 100 are connected through the wired LAN. As illustrated in the system configuration diagram of FIG. 1B, in the case where the PC 100 and the access point 112 are connected to the infrastructure network (NW) through the wired LAN and are communicable with each other, the wireless profile of the access point 112 is not present in the PC 100. In this case, in the prior confirmation processing 1, it is not determined that the SSID of the access point 112 is included in the SSID list (No in step S308). Accordingly, the setting processing illustrated in FIG. 3 fails. It is desirable to connect the printer 101 to the access point 112 and to establish a state in which the PC 100 and the printer 101 are mutually communicable through the access point 112 even in such a case. The PC 100 also includes the wireless LAN I/F 210, and can perform P2P communication with the printer 101 through the wireless Ad-hoc connection.

The processing of connecting the access point 112 and the printer 101 through the wireless LAN in a case where the access point 112 and the PC 100 are connected through wireless LANs 221 and Ethernet cables 224 and 225 is described with reference to FIG. 4. Prior confirmation processing 2 of the PC 100 illustrated in a flowchart of FIG. 4 is performed instead of the prior confirmation processing (step S307) of FIG. 3.

In step S400, the PC 100 starts the prior confirmation processing 2. Then in step S401, the PC 100 determines whether the wireless profile of the access point 112 to which the printer 101 is connected has been saved in the PC 100. In a case where a determination result is Yes in step S401

(Yes in step S401), the processing proceeds to step S402. In step S402, it is determined whether the SSID of the access point 112 is included in the SSID list acquired from the printer 101. In a case where the SSID of the access point 112 is included in the SSID list (Yes in step S402), the processing proceeds to step S409. In step S409, the PC 100 determines to connect the printer 101 to the predetermined access point. In this case, the PC 100 terminates the prior confirmation processing 2 in step S410, and instructs the wireless setting to the printer 101 in step S309. The process in step S402 is similar to the process in the prior confirmation processing 1 in step S307.

In a case where it is determined in step S401 that the wireless profile of the access point 112 has not been saved in the PC 100 (No in step S401), the processing proceeds to step S403. In step S403, an access point selection screen is displayed. In addition, as described below, the process in step S403 corresponds to input screen display processing to display an input screen on which the password is input. The case where the wireless profile of the access point 112 has not been saved in the PC 100 includes a case where the PC 100 is connected to the infrastructure NW through the wired LAN as illustrated in FIG. 1B. FIG. 5A illustrates an access point selection screen 500 displayed in step S403, and includes an SSID list 501, a password setting part 503, a wired equivalent privacy (WEP) key selection part 504, a manual addition button 505 (described below), and a "next" button 506. FIG. 5A also illustrates a state where the SSID-A of the SSID list 501 has been selected and a focus 502 has been displayed. The SSID list created by the printer 101 in step S351 and acquired by the PC 100 in step S305 is displayed in the SSID list 501. The user selects the SSID of the desired access point 112 from the SSID list 501, and inputs the password (letters or numbers) of the access point 112 in the password setting part 503. In other words, the screen illustrated in FIG. 5 is a selection screen of the access point (SSID) and is an input screen of the password. When the PC 100 acquires the SSID list (step S305), the PC 100 acquires an encryption system and a channel (frequency band) information of each of the SSIDs from the printer 101. More specifically, when executing passive scanning, the printer 101 stores the SSID, the encryption system, and the channel information from information of a beacon issued from each access point. In step S305, the PC 100 acquires the information together with the SSID list from the printer 101. In a case where the SSID selected in the SSID list 501 has been encrypted by WEP, the PC 100 validates a WEP key selection part 504 to cause the user to select the WEP key.

When the user presses the "next" button 506 illustrated in FIG. 5A, the PC 100 closes the access point selection screen 500. At this time, the PC 100 determines the SSID selected in the SSID list 501, as the SSID of the access point to which the printer 101 is connected based on the wireless setting instruction in step S309. In steps S404, S405, and S406, the PC 100 determines whether the printer 101 is connectable to the access point, based on the information input by the user. In a case where it is determined that the printer 101 is connectable to the access point, the processing proceeds to step S407. In a case where it is not determined through the processes in steps S404 to S407 that the wireless setting is instructed to the printer 101, any of various kinds of error screen display illustrated in FIGS. 6C to 6H is performed. The processes in steps S404, S405, and S406 are described below.

In step S407, the PC 100 performs prior connection confirmation for the SSID selected in the access point selection screen 500 before transmitting the SSID to the printer 101. In other words, in the access point selection screen 500, the access point to which the printer 101 is connected is selected, and the PC 100 performs the connection test on the selected access point in step S407. In the connection test in step S407, the PC 100 uses the password input by the user to perform processing for connection with the access point. Authentication processing using the password is performed in the access point through the processing. Then in step S408, the PC 100 determines success or failure of the connection performed in step S407. In a case where the password input by the user coincides with the password of the access point, the above-described authentication processing is successful, and the PC 100 and the access point are connected. In a case where the PC 100 and the access point are connected, it is determined in step S408 that the connection is successful. In the case where it is determined in step S408 that the connection is successful (Yes in step S408), the processing proceeds to step S409. In step S409, the PC 100 determines to connect the printer 101 to the predetermined access point, and the processing proceeds to step S410. In step S410, the PC 100 terminates the prior confirmation processing 2.

The wireless profile created by the connection executed in step S407 is deleted by the processing in step S311. This makes it possible to prevent the profile created by the PC 100 without intent by the user from remaining in the ROM 202.

In addition, in a case where the connection of the PC 100 to the access point is successful in the connection test in step S407, the PC 100 can maintain the connection state and can search the printer in step S312 without performing connection with the access point in step S310. Alternatively, the connection with the access point can be disconnected at the end of the prior confirmation processing 2, and connection with the access point can be re-established in step S310. In the latter case, even if the instruction of the wireless setting to the printer 101 in step S309 has not been performed, it is possible to prevent the PC 100 from being continuously connected to the access point specified by the user.

Figure 6C:
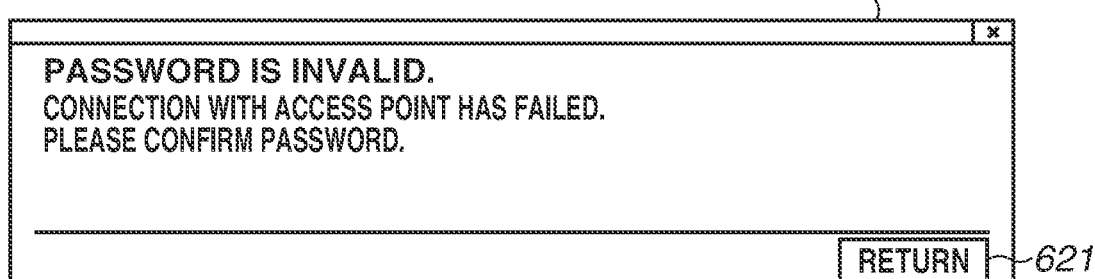
Figure 6D:
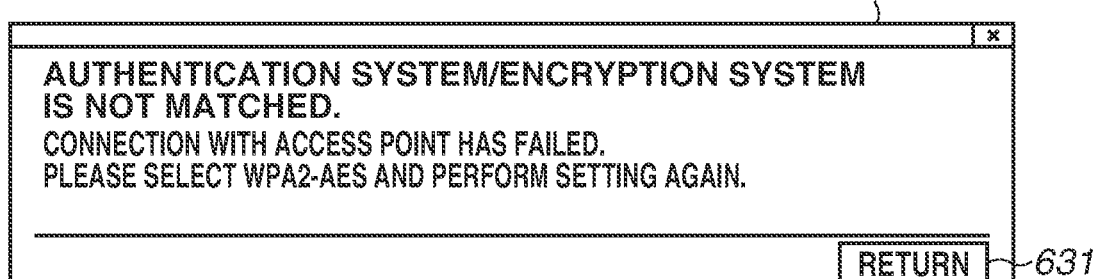
Figure 6E:
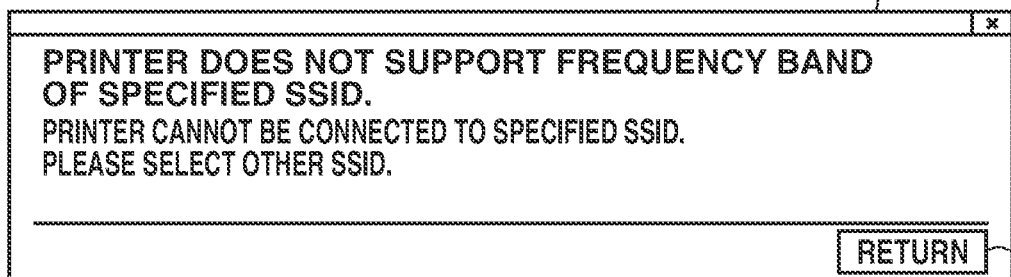
Figure 6F:
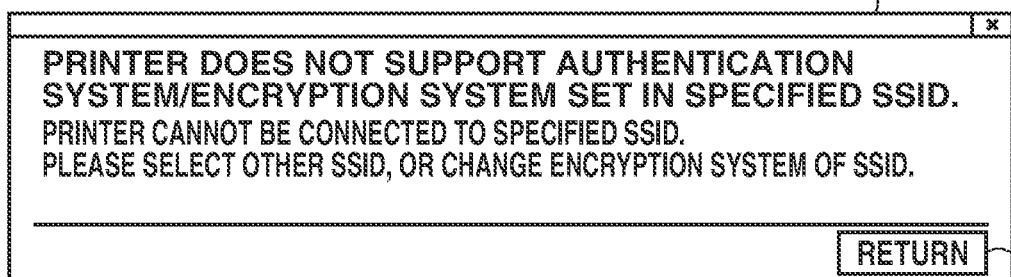
Figure 6G:
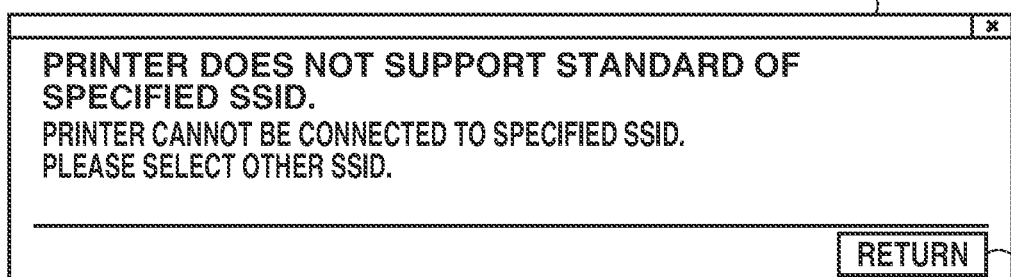

In a case where it is determined in step S408 that the connection fails (No in step S408), the processing proceeds to step S411. In step S411, the PC 100 displays, as error display, an error screen indicating a password mismatch. FIG. 6C illustrates an error screen 620 that is displayed in step S411 and indicates a password mismatch. The PC 100 notifies the user that the connection with the access point 112 failed and that the password input by the user is invalid, through the display of the error screen 620. When a "return" button 621 in the error screen 620 is pressed, the PC 100 closes the error screen 620, and displays the access point selection screen 500 again in step S403 to prompt the user to perform re-input of the password.

It is possible to perform, on the printer 101, connection instruction for an SSID, the wireless profile of which is not stored by the PC 100, through the processes illustrated in steps S407 and S408. In addition, it is possible to confirm connection with the access point by the PC 100 before the PC 100 transmits, to the printer 101, the wireless profile including the SSID and the password of the access point.

As a result, even if the user inputs a wrong password, it is possible to prevent the wrong password from being notified to the printer 101. If the prior confirmation processing 2 illustrated in FIG. 4 is not performed and only the prior confirmation processing 1 (step S307) is performed, the PC 100 performs the connection setting instruction to the printer 101 with the wrong password (S309). As a result, the printer 101 fails in the connection with the access point, and the printer 101 displays connection failure error (step S360). In addition, display of failed setting (step S316) is performed by the PC 100. In this case, since the processing such as connection processing by the printer 101 and the printer searching by the PC 100 are performed before the display, it takes a long time until the user recognizes the connection failure. In addition, to retry the wireless setting of the printer 101, it is necessary for the user to release the error of the printer 101 and to perform operation of shifting the mode to the wireless setting mode again. Accordingly, applying the prior confirmation processing 2 illustrated in FIG. 4 to step S307 of FIG. 3 enables the user to know the input mistake of the password before a connection failure error occurs on the printer 101.

Another case where the PC 100 does not store the wireless profile of the access point to which the printer 101 is connected is described with reference to FIG. 1C. In the case illustrated in FIG. 1C, an access point 122 and an access point 123 are bridge-connected. More specifically, the access point 123 that is set to a bridge mode is relayed to the access point 122, and the access point 122 and the access point 123 are connected through the same sub-net. The bridge connection is used, for example, in a case where a wireless NW environment of the same sub-net is established among a plurality of rooms. In a system configuration illustrated in FIG. 1C, the PC 100 is connected to the access point 122 (SSID1) through the wireless LAN I/F 210, and the printer 101 is connected to the access point 123 (SSID2) through the wireless LAN I/F 246. The PC 100 and the printer 101 are mutually communicable through the access point 122 and the access point 123. To connect the printer 101 to the access point 123 for construction of such an infrastructure NW environment, the PC 100 transmits the wireless setting to the printer 101 through the wireless Ad-hoc communication. For example, in a case where the PC 100 and the printer 101 are not sufficiently close to each other to perform wireless Ad-hoc communication, it is supposed that the user temporarily brings the PC 100 close to the printer 101 to perform the wireless setting of the printer 101.

In the case illustrated in FIG. 1C, however, the PC 100 is not connected to the access point 123, and does not store the SSID2 and the other setting information of the access point 123 as the wireless profile. Even in this case, the processing illustrated in FIG. 4 enables the user to select the SSID2 in the access point selection screen 500, thereby connecting the printer 101 to the access point 123. The prior connection confirmation is performed by the PC 100 in step S407, which makes it possible to prevent the wrong password from being transmitted to the printer 101 even under the bridge connection environment.

Yet another case where the PC 100 does not store the wireless profile of the access point (SSID) to which the printer 101 is connected is described with reference to FIG. 1D. An access point 132 supports two or more kinds of SSIDs of different frequency bands. The access point that supports a frequency band of 5 GHz such as 802.11ac standard is commercially available as the access point used in a home environment. Connection in the frequency band of 5 GHz enables avoidance of crosstalk in the frequency band of 2.4 GHz that has been widely used.

In a system configuration diagram illustrated in FIG. 1D, the PC 100 is connected to the SSID1 of the access point 132, the standard of which supports the frequency band of 5 GHz, through the wireless LAN I/F 210. In a case where the wireless LAN I/F 246 of the printer 101 does not support the frequency band of 5 GHz, the printer 101 is not connectable to the SSID1 even if the PC 100 performs the connection instruction to the connected SSID1. In addition, the PC 100 stores the wireless profile of the SSID1 because the PC 100 is connected to the SSID1 using the frequency band of 5 GHz. However, the PC 100 may not store the wireless profile of the SSID2. Accordingly, the access point selection screen 500 is displayed in step S403, and the user can select SSID2 that supports the frequency band of 2.4 GHz to which the printer 101 is connectable. In this case, the PC 100 performs the connection instruction (S309) on the printer 101, which enables the printer 101 to be connected to the access point 132. In addition, since the process in step S408 is performed before the connection instruction is performed (S309), it is possible to prevent the wrong password from being transmitted to the printer 101.

In the above description, the case where the PC 100 does not store the wireless profile of the access point to which the printer 101 is connected has been described with reference to FIG. 1D. The SSID2 of the desired access point 132 may not be displayed on the access point selection screen 500 in some cases. In other words, the SSID2 may not be detected in the SSID searching processing (step S351) of the printer 101. More specifically, such a case includes a case where a stealth mode is set to the access point 132. The stealth mode is set in consideration of more secure setting in some cases, and enables setting in which the SSID name is not displayed on the beacon issued by the access point or setting in which the beacon is not issued. Accordingly, in the case where the stealth mode is set, the SSID2 of the access point 132 is not detected by the SSID searching processing of the printer 101 and is not displayed in the SSID list 501.

In such a case, the user can manually add the SSID by pressing the manual addition button 505 included in the access point selection screen 500. The user manually adds the SSID2 of the access point 132 in an access point manual addition screen 520 illustrated in FIG. 5B that is displayed in response to pressing of the manual addition button 505. Even when the stealth mode is set, the access point 132 responds in the method (active scanning) in which the SSID name is specified and searched. The access point manual addition screen 520 includes an SSID input part 521, an encryption system selection part 522, an encryption system setting part 523, an OK button 524, and a Cancel button 525. The encryption system setting part 523 switches a setting item to be selected, depending on the encryption system selected in the encryption system selection part 522. For example, the encryption system setting part 523 switches items to be displayed in the encryption system setting part 523 between a case where WEP is selected in the encryption system selection part 522 and a case where WPA/WPA2 is selected in the encryption system selection part 522. When the OK button 524 or the Cancel button 525 is pressed, the screen displayed in the prior confirmation processing 2 of the PC 100 returns to the access point selection screen 500. When the OK button 524 is pressed, in the prior confirmation processing 2 of the PC 100, the SSID name input in the SSID input part 521 of the access point manual addition screen 520 is additionally displayed in the SSID list 501. In the case of the SSID found in the SSID searching processing (passive scanning) in step S351, the PC 100 can previously acquire the wireless setting information such as the encryption system and the channel information for determination of the frequency band. In contrast, in a case where the SSID is input in the access point manual addition screen 520, the PC 100 does not hold the wireless setting information. Therefore, it is necessary for the PC 100 to prompt the user to input various kinds of wireless setting information. The encryption system and the SSID that supports the frequency band matched with the printer 101, however, may not be selected or inputted correctly. Accordingly, in FIG. 4, presence of the SSID is confirmed in step S404.

Figure 7:
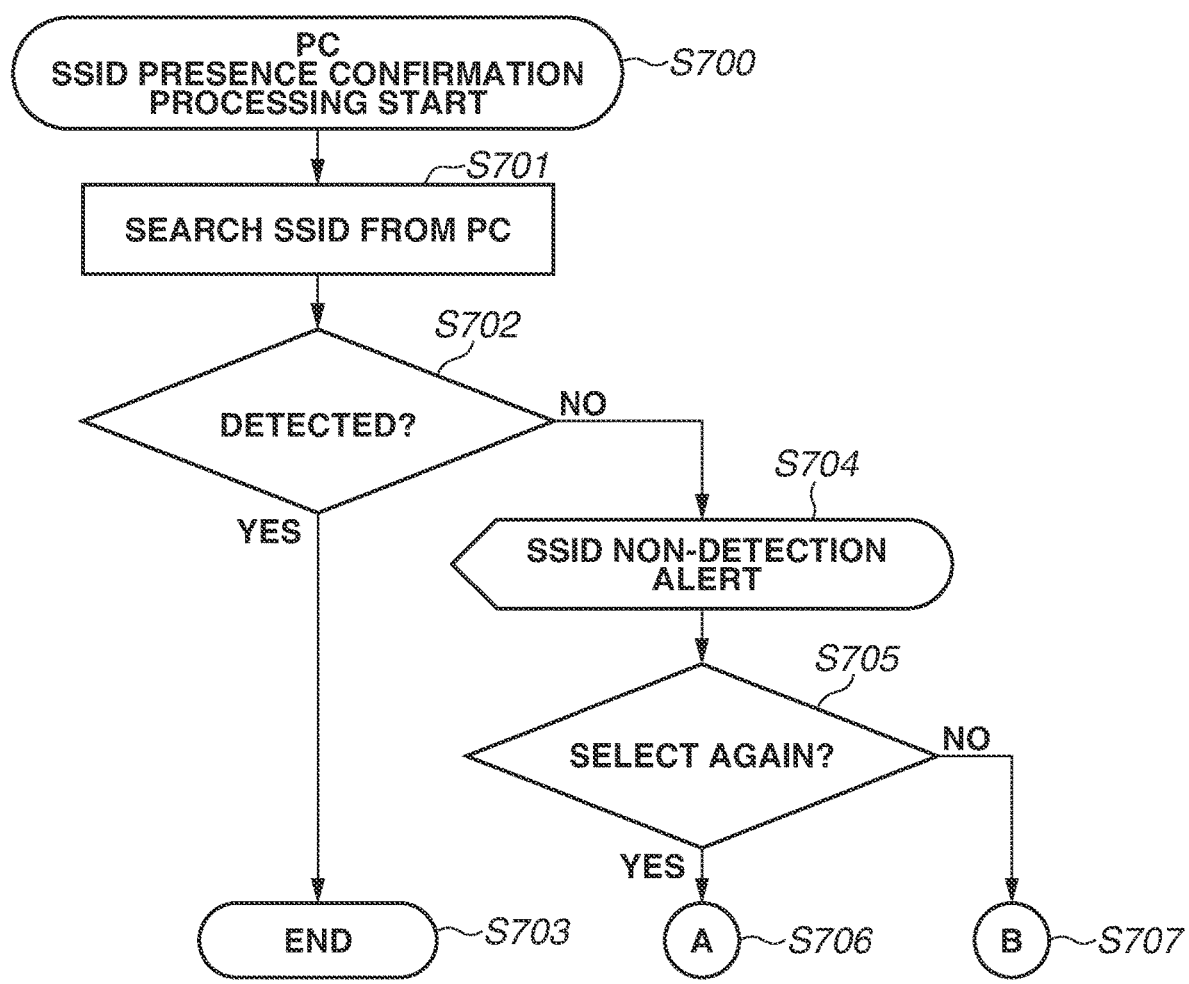
FIG. 7 is a flowchart illustrating an example of processing in which the PC confirms presence of a service set identifier (SSID).

FIG. 7 is a flowchart illustrating processing of confirming presence of the SSID executed in step S404.

In step S700, when the "next" button 506 illustrated in FIG. 5A is pressed, the PC 100 starts SSID presence confirmation processing. In this example, it is assumed that the SSID2 (SSID-D) of the access point 132 that has been input in the access point manual addition screen 520 is selected in the access point selection screen 500, and the "next" button 506 is then pressed.

The PC 100 performs searching processing (active scanning) whether the specified SSID is present in step S701, and determines whether the specified SSID2 has been detected in step S702. In a case where it is determined in step S702 that the SSID2 has been detected (Yes in step S702), the processing proceeds to step S703. In step S703, the PC 100 terminates the SSID presence confirmation processing, and shifts to next SSID information confirmation processing (step S405). In the case where the SSID2 has been detected in step S702, the wireless setting information of the access point with the SSID2 acquired in searching in step S701 is stored in the ROM 202. The wireless setting information is used in the process in step S405 (processing illustrated in FIG. 8) and the process in step S406 (processing illustrated in FIG. 9) both described below.

In a case where it is determined in step S702 that the SSID2 of the access point 132 has not been detected (No in step S702), the processing proceeds to step S704. In step S704, the PC 100 displays, as error display, an SSID non-detection alert screen 670 of FIG. 6H. As a result, non-detection of the SSID2 is notified from the PC 100. The PC 100 displays a "next" button 672 and a "return" button 671 in the SSID non-detection alert screen 670, and inquires of the user whether reselection by the access point selection screen 500 is performed. The PC 100 then determines which button has been pressed by the user in the SSID non-detection alert screen 670 (step S705). In a case where the user has pressed the "return" button 671, i.e., in a case where the user wishes to re-select an SSID (Yes in step S705), the PC 100 closes the SSID non-detection alert screen 670. The PC 100 then terminates the SSID presence confirmation processing (step S706), and the processing returns to step S403. In a case where the user has pressed the "next" button 672 (No in step S705), the PC 100 closes the SSID non-detection alert screen 670. The PC 100 then terminates the SSID presence confirmation processing (step S707), and determines to connect the printer 101 to the predetermined access point (step S409). Accordingly, the wireless setting instruction is issued to the printer 101 based on the wireless setting that has been input in the access point selection screen 500 and the access point manual addition screen 520.

Figure 6H:
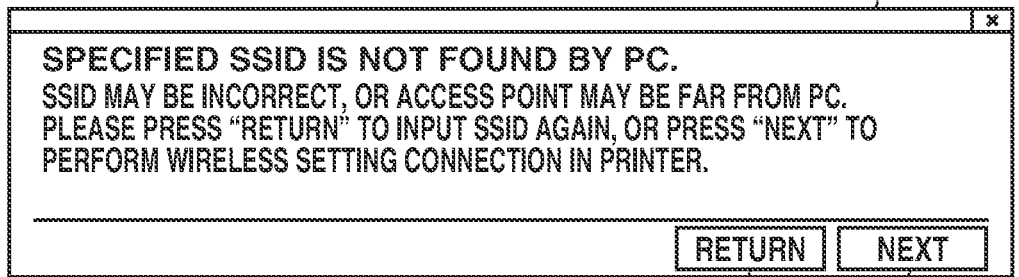

It is assumed that the user can select the "return" button 671 in FIG. 6H in a case where the user makes an input mistake of the SSID name. As a case where the user selects the "next" button 672, a case where the access point 132 is located at a position that is not detectable by the PC 100 is presumed. The latter case is assumed to be one where the access point 132 is not detected by the PC 100, but is detectable by the printer 101. In this case, for example, a case where the printer 101 is connected to the access point 132 and then the user brings the PC 100 close to the access point 132 is presumed. Accordingly, displaying the screen illustrated in FIG. 6H enables prompting the user to bring the PC 100 close to the access point 132. Alternatively, a case where the PC 100 and the access point 132 are connected by a wire, and the access point 132 is located at a position that cannot be detected by the PC 100 is presumed. In this case, it is unnecessary that the PC 100 and the access point 132 are wirelessly connected. Therefore, the user can determine that there is no problem if the SSID of the access point 132 is not detected by the PC 100. In this case, the user can select the "next" button 672.

In the case where the access point 132 is not detected by the PC 100 due to selection of the "next" button 672 by the user as described above, it is possible to prevent occurrence of the setting failure error (step S316) that is not intended by the user, and to perform the wireless setting on the printer 101.

In the above description, the case where the stealth mode is set to the access point 132 is described as the example in which the SSID2 of the desired access point 132 is not displayed in the access point selection screen 500. As another example, there is a case where the SSID list stored by the printer 101 is limited in size. In a case where the ROM 243 of the printer 101 is small in size, the SSID2 desired by the user may not be stored in the SSID list in creation of the SSID list (step S351). For example, in a case where a large number of access points are present in the vicinity thereof, as in a complex housing, and the number of SSIDs to be included in the SSID list is large, the SSID desired by the user may not be included in the SSID list. For another example, in a case where a large channel number is assigned, the SSID desired by the user may not be included in the SSID list. The SSIDs sequentially detected in step S351 are sequentially stored in the SSID list. Accordingly, in these cases, the number of SSIDs exceeds the storable number of the SSID list before the SSID2 desired by the user is detected, and the SSID2 is omitted from the SSID list.

Figure 8:
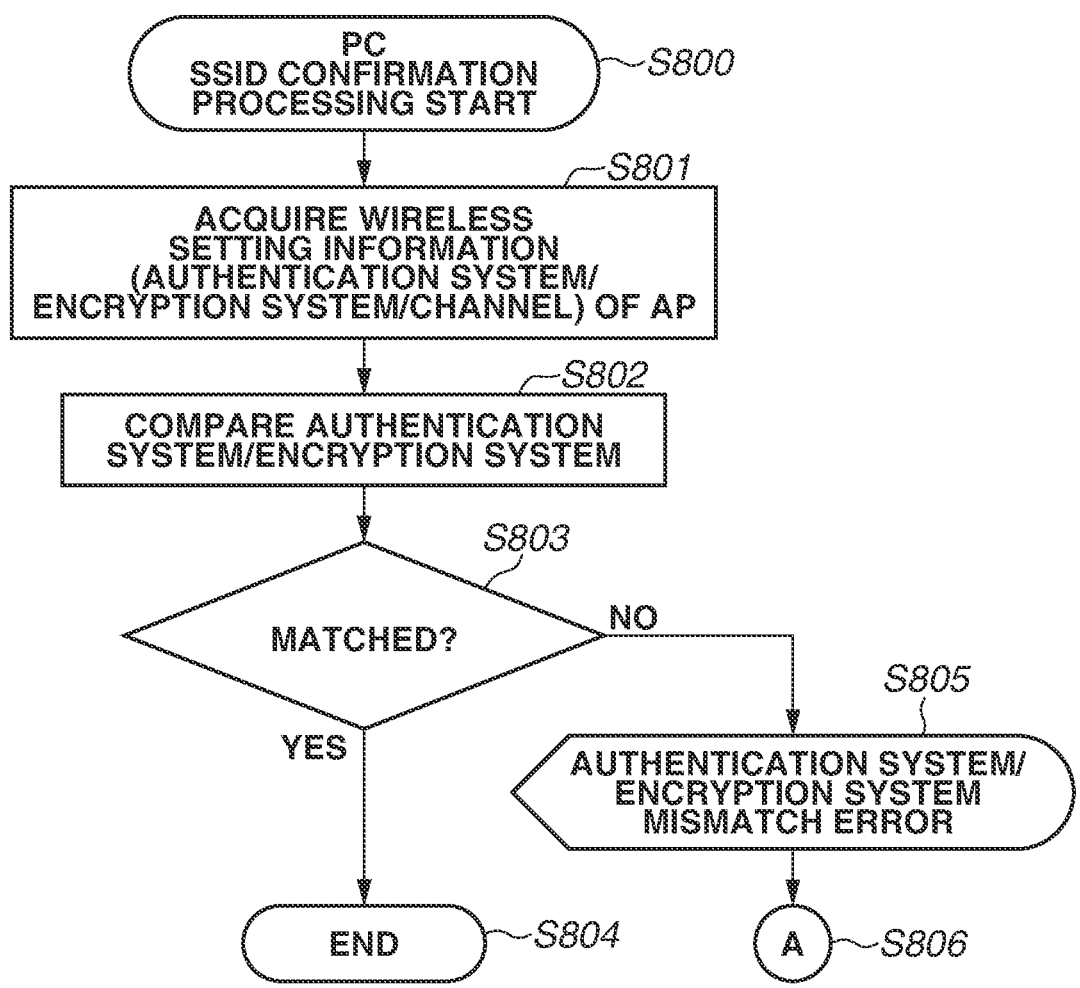
FIG. 8 is a flowchart illustrating an example of processing in which the PC confirms SSID setting information.

Next, the SSID information confirmation in step S405 of FIG. 4 is described with reference to FIG. 8. The processing of FIG. 8 is performed when the SSID selected by the user from the list or the SSID manually input by the user is detected by the PC 100 (Yes in step S702 of FIG. 7) in the process in step S404 illustrated in FIG. 7.

In step S800, the PC 100 starts the SSID confirmation processing. In step S801, the PC 100 acquires the wireless setting information of the access point with the SSID2 that is stored by the ROM 202 in the specification searching (step S701) of the SSID2. The wireless setting information includes, for example, authentication system, encryption system, a frequency band (channel), and a wireless standard that are used in the access point. To acquire the frequency band to be used in the access point, for example, the following method is used. In step S701, the PC 100 performs searching in the plurality of frequency bands, and the frequency band used when the SSID2 is detected is stored, in the ROM 202, as the frequency band supported by the access point with the SSID2 of the wireless setting information. The other information of the wireless setting information is acquired, for example, from the access point with the SSID2 in the searching in step S701.

Then, in step S802, the PC 100 compares the authentication system and the encryption system set in the access point manual addition screen 520 with the authentication system and the encryption system included in the wireless setting information acquired in step S801. The PC 100 then determines whether both of the authentication systems and the encryption systems match (step S803).

In a case where the authentication systems and the encryption systems is determined to match in step S803 (Yes in step S803), the processing proceeds to step S804. In step S804, the PC 100 terminates the SSID confirmation processing. In a case where the authentication systems and the encryption systems is not determined to match in step S803 (No in step S803), the PC 100 presents, as error display, a display indicating an authentication system/encryption system mismatch error illustrated in FIG. 6D in step S805. The fact that one or both of the authentication system and the encryption system set to the SSID2 of the access point 132 are not matched with those input in the access point manual addition screen 520 is notified to the user through the display illustrated in FIG. 6D. When a "return" button 631 is pressed, the PC 100 closes an authentication system/encryption system mismatch error screen 630, and terminates the SSID confirmation processing (step S806 and step S412). The PC 100 then displays the access point selection screen 500 again, and prompts the user to perform resetting. As a result, it is possible for the user to acknowledge the incorrect input of the authentication system/encryption system before the wireless setting instruction (step S309) is performed on the printer 101. In other words, it is possible to prevent occurrence of the connection failure error (step S360) in the printer 101. The user can input the authentication system and the encryption system again by pressing the "return" button 631.

In a case where the SSID confirmation processing ends in step S804, the PC 100 performs printer specification confirmation processing as a next confirmation processing (step S406). The process in step S406 is described with reference to FIG. 9.

Figure 9:
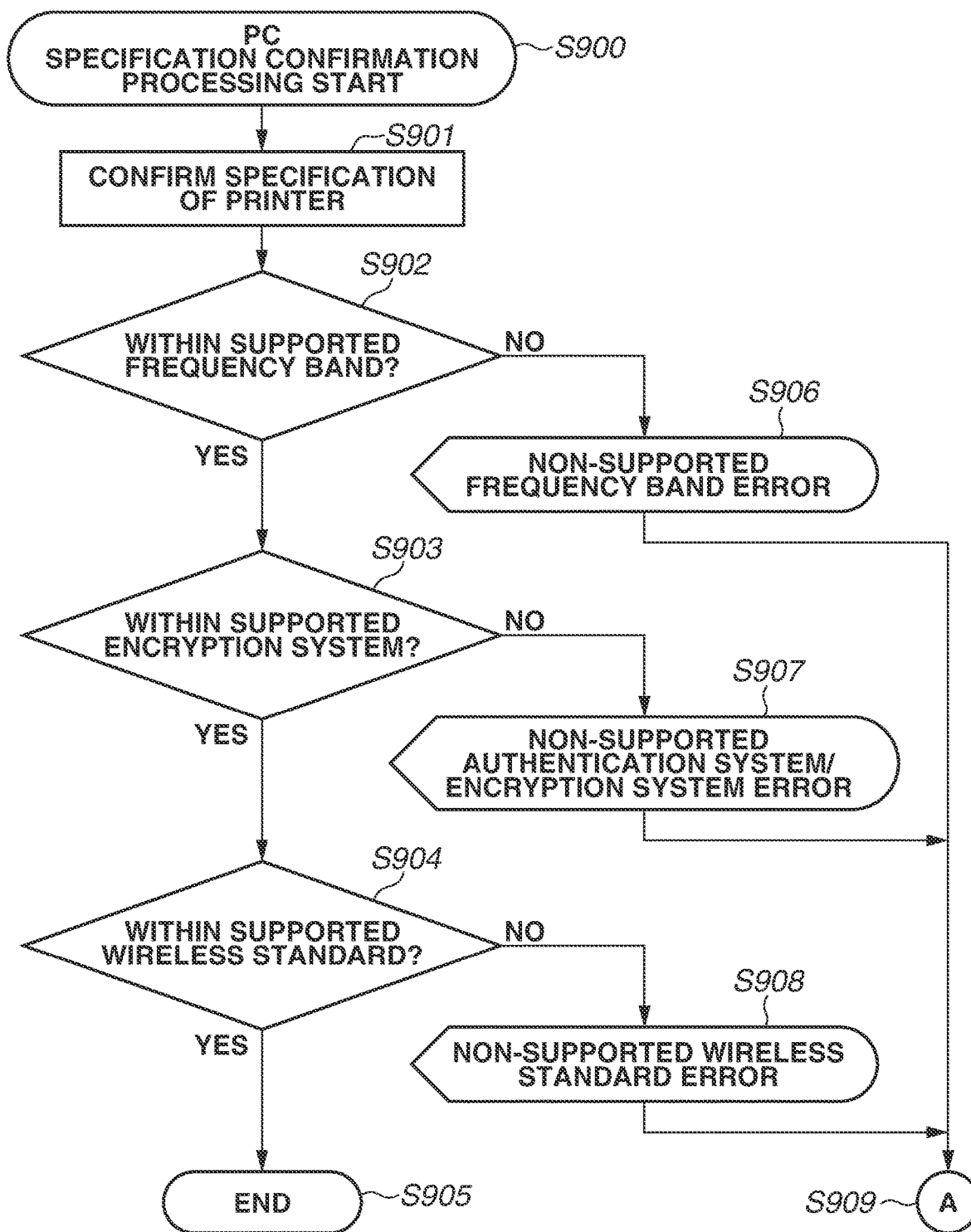
FIG. 9 is a flowchart illustrating an example of processing in which the PC confirms specification of the printer.

Performance information of the printer is used in the processing in FIG. 9. In the process of acquiring the information from the printer 101 (step S305), the PC 100 acquires the performance information of the printer 101 through the information transmission processing of the printer 101 (step S355). The performance information of the printer 101 includes various kinds of wireless information supported by the printer 101, such as support channel information for determination of a frequency band, supported authentication system and encryption system information, and supported wireless standard information.

In step S900, the PC 100 starts the printer specification confirmation processing. In step S901, the PC 100 confirms the specification of the printer 101. In step S902, the PC 100 determines whether the frequency band supported by the SSID2 of the access point 132 is supported by the printer 101 (is usable by printer 101). In the determination in step S902, the frequency band supported by the access point and included in the wireless setting information that has been stored in the ROM 202 in step S701 and acquired in step S801 is compared with the frequency band included in the performance information of the printer 101.

In a case where a determination result is Yes in step S902 (Yes in step S902), the processing proceeds to step S903, and the PC 100 performs next determination (step S903). In step S903, the PC 100 determines whether the authentication system/encryption system set to the SSID2 of the access point 132 is supported by the printer 101 (is usable by printer 101). In the determination in step S903, the authentication system/encryption system supported by the access point and included in the above-described wireless setting information is compared with the authentication system/encryption system included in the performance information of the printer 101.

In a case where a determination result is Yes in step S903 (Yes in step S903), the processing proceeds to step S904, and the PC 100 performs next determination (step S904). In step S904, the PC 100 determines whether the wireless standard (e.g., 802.11b/g/n) under which the SSID2 of the access point 132 operates is supported by the printer 101 (is usable by printer 101). In the determination in step S904, the wireless standard supported by the access point and included in the above-described wireless setting information is compared with the wireless standard included in the performance information of the printer 101. In a case where a determination result is Yes in step S904 (Yes in step S904), the processing proceeds to step S905. In step S905, the PC 100 terminates the specification confirmation processing.

In a case where it is determined in any of steps S902, S903, and S904 that the printer 101 does not support the frequency band, the system, or the wireless standard, the PC 100 displays various kinds of error screens. In the case where it is determined the frequency band is not supported in step S902 (No in step S902), the processing proceeds to step S906. In step S906, the PC 100 displays, as error display, a non-supported frequency band error screen (640) illustrated in FIG. 6E. As a result, notification to prompt the user to select another SSID is performed. In a case where it is determined that the authentication system/encryption system is not supported in step S903 (No in step S903), the processing proceeds to step S907. In step 907, the PC 100 displays a non-supported authentication system/encryption system error screen (650) illustrated in FIG. 6F. The PC 100 performs notification to prompt the user to select a different SSID or to change the setting of the SSID2 of the access point 132 through the display in step S907. In a case where it is determined that the wireless standard is not supported, (No in step S904), the processing proceeds to step S908. In step S908, the PC 100 displays, as error display, a non-supported wireless standard error screen (660) illustrated in FIG. 6G. As a result, notification to prompt the user to select a different SSID is performed. When the "return" button (641, 651, or 661) in each error screen is pressed, the PC 100 closes the error screen, and terminates the processing (step S909 and step S412). In other words, it is possible to prevent occurrence of the connection failure error in the printer 101 (step S360).

According to the above-described exemplary embodiment, it is possible to confirm the connection to the access point by the PC 100 before the wireless profile including the SSID and the password of the access point is transmitted to the printer 101, through the processes in steps S407 and S408. For example, if the user mistakenly inputs a wrong password, it is possible to perform notification to the user as illustrated in FIG. 6C before the wireless profile is transmitted to the printer 101. In addition, if the SSID, the authentication system, or the encryption system input by the user is incorrect, or if the desired access point and the performance information relating to the wireless communication of the printer 101 are not matched to each other, it is possible to perform notification to the user through the processes in steps S404 to S407.

In the case where the notification to the user is performed through the confirmation processing before the wireless setting instruction is issued to the printer 101 (step S309), the display contents are changed based on the notification reason (confirmation step) as illustrated in FIG. 6C to FIG. 6H. Therefore, in the case where the user re-inputs the various kinds of information or reselects an access point, the user can re-input the information for the appropriate items, and reselect the appropriate access point. In the case where the screen is displayed again in step S403 after step S411, the letters and the numbers input by the user and the selected contents before the display of the error screen illustrated in FIG. 6C are displayed.

In the processing illustrated in FIG. 4, the connection test to the access point in step S407 is performed after the SSID presence confirmation processing in step S404. In addition, in a case where it is determined in step S404 that the SSID is not present, the error display illustrated in FIG. 6H is performed in a state where the process in step S407 is not performed. In other words, in the case where the determination result indicates an error in step S404, the error display is performed without waiting for the authentication processing of the access point executed by the process in step S407. This makes it possible to promptly notify the user of the error.

In addition, in the above-described exemplary embodiment, the wireless Ad-hoc connection by the wireless LAN has been described as an exemplary technique of the P2P connection between the printer 101 and the PC 100. In addition thereto, short-range wireless communication such as universal serial bus (USB) connection, Ethernet cable connection, and near field radio communication (NFC) can be applied as the above-described wireless Ad-hoc connection. In addition, P2P connection such as Bluetooth® Low Energy connection can be applied as the wireless Ad-hoc connection in the present exemplary embodiment.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-094858, filed May 11, 2017, which is hereby incorporated by reference herein in its entirety.

What is claimed is:

1. A communication method of an information processing apparatus, the communication method comprising:
   performing wireless communication with a communication apparatus;
   receiving from the communication apparatus, via the wireless communication, identifying information of an access point which is external to the information processing apparatus and the communication apparatus;
   acquiring, through user input to the information processing apparatus, authentication information to be used in an authentication process for connecting to the access point;
   after acquiring the authentication information, performing connection processing for connecting the information processing apparatus to the access point using the identifying information that is received from the communication apparatus and the authentication information that is acquired through the user input;
   determining whether or not the connection processing is successful; and
   based on it being determined that the connection processing using the identifying information that is received from the communication apparatus and the authentication information that is acquired through the user input to the information processing apparatus is successful, transmitting to the communication apparatus, via the wireless communication, the acquired authentication information, wherein the acquired authentication information is usable by the communication apparatus to connect to the access point.

2. The communication method according to claim 1, wherein, in the transmitting, the information processing apparatus transmits the identifying information of the access point and the acquired authentication information to the communication apparatus, and
   wherein the communication apparatus performs connection processing for connecting the communication apparatus to the access point using the identifying information and the acquired authentication information transmitted from the information processing apparatus.

3. The communication method according to claim 1, wherein the communication method further comprises displaying a screen indicating the identifying information of the access point and allowing a user to input the authentication information.

4. The communication method according to claim 3, wherein the communication method further comprises determining, based on an instruction by the user, the identifying information of the access point with which the connection processing is to be performed, the identifying information determined from among a plurality of pieces of identifying information, the plurality of pieces of identifying information received from the communication apparatus and displayed on the screen, and
   wherein the connection processing is performed using the determined identifying information and the acquired authentication information.

5. The communication method according to claim 1, wherein the communication method further comprises displaying an error screen in a case where it is determined that the connection processing performed by the information processing apparatus to connect to the access point is not successful.

6. The communication method according to claim 1,
wherein the communication method further comprises storing, in the information processing apparatus, first identifying information and authentication information of an access point to which the information processing apparatus has been connected, and
wherein, in a case where a received second identifying information corresponds to the stored first identifying information, and the stored authentication information is transmitted to the communication apparatus, the stored authentication information to be used by the communication apparatus to connect to the access point to which the information processing apparatus has been connected.

7. The communication method according to claim 6, wherein, the identifying information is received from the communication apparatus in part by disconnecting wireless connection with the access point to which the information processing apparatus has been connected and performing wireless connection with the communication apparatus.

8. The communication method according to claim 1, wherein the communication method further comprises searching for the communication apparatus after transmitting the acquired authentication information to be used in connecting to the access point to the communication apparatus.

9. The communication method according to claim 8,
wherein identification information of the communication apparatus is received from the communication apparatus, and
wherein the communication apparatus is detected by the searching using the identification information.

10. The communication method according to claim 1, wherein the communication method further comprises:
searching for an access point corresponding to the received identifying information; and
displaying an error screen in a case where the access point corresponding to the identifying information is not detected.

11. The communication method according to claim 10, wherein the error screen is displayed in a state where the connection processing is not performed.

12. The communication method according to claim 1,
wherein first wireless setting information relating to the access point is received from the communication apparatus,
wherein second wireless setting information relating to the access point is input by a user, and
wherein, if the received first wireless setting information does not correspond to the input second wireless setting information, the communication method further comprises displaying an error screen.

13. The communication method according to claim 12, wherein the each of the first wireless setting information and the second wireless setting information indicates an encryption system or an authentication system, of a wireless local area network (LAN), relating to the access point.

14. The communication method according to claim 12, wherein the communication method further comprises:
confirming performance information of the communication apparatus relating to the wireless communication; and
displaying another error screen if the confirmed performance information does not correspond to the received first wireless setting information.

15. The communication method according to claim 14, wherein the another error screen is displayed if a frequency band used in the wireless communication and included in the performance information does not correspond to a frequency band used in the wireless communication and included in the first wireless setting information.

16. The communication method according to claim 1, wherein communication to receive the identifying information and to transmit the acquired authentication information is performed through a peer-to-peer wireless connection with the communication apparatus.

17. The communication method according to claim 1, wherein the communication to receive the identifying information and to transmit the acquired authentication information is performed via communication between the communication apparatus and the information processing apparatus through a wireless LAN, and the communication apparatus is connected to the access point through the wireless LAN.

18. The communication method according to claim 1, wherein the communication to receive the identifying information and to transmit the acquired authentication information is performed via communication between the communication apparatus and the information processing apparatus through a Bluetooth® Low Energy (BLE) connection, and the communication apparatus is connected to the access point through a wireless LAN.

19. The communication method according to claim 1, wherein the communication apparatus is a printer.

20. A non-transitory storage medium storing a program for causing an information processing apparatus to execute a communication method, the communication method comprising:
performing wireless communication with a communication apparatus;
receiving from the communication apparatus, via the wireless communication, identifying information of an access point which is external to the information processing apparatus and the communication apparatus;
acquiring, through user input to the information processing apparatus, authentication information to be used in an authentication process for connecting to the access point;
after acquiring the authentication information, performing connection processing for connecting the information processing apparatus to the access point using the identifying information that is received from the communication apparatus and the authentication information that is acquired through the user input;
determining whether or not the connection processing is successful; and based on it being determined that the connection processing using the identifying information that is received from the communication apparatus and the authentication information that is acquired through the user input to the information processing apparatus is successful, transmitting to the communication apparatus, via the wireless communication, the acquired authentication information, wherein the acquired authentication information is usable by the communication apparatus to connect to the access point.

21. An information processing apparatus comprising: one or more processors;
one or more memories storing a program which, when executed by the one or more processors, causes the information processing apparatus to perform the following operations:
performing wireless communication with a communication apparatus;

receiving from the communication apparatus, via the wireless communication, identifying information of an access point which is external to the information processing apparatus and the communication apparatus;

acquiring, through user input to the information processing apparatus, authentication information to be used in an authentication process for connecting to the access point;

after acquiring the authentication information, performing connection processing for connecting the information processing apparatus to the access point using the identifying information that is received from the communication apparatus and the authentication information that is acquired through the user input;

determining whether or not the connection processing is successful; and based on it being determined that the connection processing using the identifying information that is received from the communication apparatus and the authentication information that is acquired through the user input to the information processing apparatus is successful, transmitting to the communication apparatus, via the wireless communication, the acquired authentication information, wherein the acquired authentication information is usable by the communication apparatus to connect to the access point.

22. A communication method executed by at least one first processor of an information processing apparatus and at least one second processor of a communication apparatus, the communication method comprising:

performing wireless communication between the information processing apparatus and the communication apparatus;

receiving, by the at least one first processor, from the communication apparatus, via a the wireless communication, identifying information of an access point which is external to the information processing apparatus and the communication apparatus;

acquiring, by the at least one first processor, through user input to the information processing apparatus, authentication information to be used in an authentication process for connecting to the access point; after acquiring the authentication information, performing, by the at least one first processor, connection processing for connecting the information processing apparatus to the access point using the identifying information that is received from the communication apparatus and the authentication information that is acquired through the user input;

determining, by the at least one first processor, whether or not the connection processing is successful; and based on it being determined that the connection processing using the identifying information that is received from the communication apparatus and the authentication information that is acquired through the user input to the information processing apparatus is successful, transmitting, by the at least one first processor, to the communication apparatus, via the wireless communication, the acquired authentication information, wherein the acquired authentication information is usable by the communication apparatus to connect to the access point;

receiving, by the at least one second processor, the acquired authentication information transmitted by the at least one first processor; and connecting, by the at least one second processor, the communication apparatus to the access point associated with the identifying information, using the acquired authentication information received from the information processing apparatus.

23. The communication method according to claim 22, wherein the communication method further comprises determining whether the communication apparatus receives a request for the identifying information or receives an instruction to connect to the access point, the access point corresponding to the identifying information, wherein the communication apparatus transmits the identifying information, in a case where it is determined that the communication apparatus receives the request, and wherein the instruction includes the acquired authentication information, and the communication apparatus connects to the access point associated with the identifying information using the acquired authentication information, in a case where it is determined that the communication apparatus receives the instruction.

* * * * *